United States Patent [19]

Ogata

[11] Patent Number: 5,299,062
[45] Date of Patent: Mar. 29, 1994

[54] OPTICAL LENS

[75] Inventor: Shiro Ogata, Kyoto, Japan

[73] Assignee: Omron Corporation, Kyoto, Japan

[21] Appl. No.: 699,329

[22] Filed: May 13, 1991

[30] Foreign Application Priority Data

May 11, 1990 [JP] Japan .................................. 2-122357

[51] Int. Cl.[5] .......................... G02B 27/44; G02B 5/18; G02B 13/18
[52] U.S. Cl. .................................... 359/571; 359/565; 359/570; 359/576; 359/718
[58] Field of Search ............... 359/708, 718, 571, 565, 359/571, 570, 576

[56] References Cited

U.S. PATENT DOCUMENTS

| | | | |
|---|---|---|---|
| 4,210,391 | 7/1980 | Cohen | 359/565 X |
| 4,338,005 | 7/1982 | Cohen | 359/571 X |
| 4,340,283 | 7/1982 | Cohen | 359/565 X |
| 4,738,516 | 4/1988 | Verhoeven et al. | 359/718 |
| 4,838,645 | 6/1989 | Mächler et al. | 359/571 |
| 4,842,969 | 6/1989 | Kawatsuki et al. | 359/571 |
| 4,986,641 | 1/1991 | Braat | 359/708 |

*Primary Examiner*—Scott J. Sugarman
*Attorney, Agent, or Firm*—Dickstein, Shapiro & Morin

[57] ABSTRACT

The present invention involves a corrective optical lens construction and process for its manufacture. The lens construction consists of a glass lens having a corrective layer consisting of a blazed grating of annuli whose angles are formed to correct aberrations in the glass lens. In a first embodiment, the corrective layer is formed on one convex surface of the lens. In a second embodiment, the corrective layer is formed on a second convex surface of the lens. Embodiments also describe alternative lens shapes and corrective layer construction. A method of manufacturing the lens is also disclosed in which the resin corrective layer is molded to the glass lens.

15 Claims, 4 Drawing Sheets

OPTICAL LENS

FIELD OF THE INVENTION

This invention relates to a non-spherical optical lens.

BACKGROUND OF THE INVENTION

An ordinary glass lens is either composed of a pair of spherical surfaces or one spherical surface and one flat surface. It is well established that most spherical lenses are typically subject to aberrations. In these types of lenses, as shown in FIG. 7, parallel light rays 52 strike the spherical lens 51 and pass through it. The transmitted light rays 53, however, do not typically converge on a single point along the axis of the light beam, but are instead scattered in various directions depending on their respective angles of incidence. FIG. 8 shows a curve expressing the usual wavefront aberrations of the spherical lens of FIG. 7. The vertical axis h shows the position of incidence, and the horizontal axis shows the phase shift.

To avoid the above problems, non-spherical lenses are sometimes employed which are free of aberrations. However, the processes used to produce a non-spherical glass lens exhibiting such qualities such as non-spherical polishing, are complex which makes such lenses difficult to mass-produce and extremely costly.

It has been found that non-spherical plastic lenses can be mass-produced through a simple process of pouring an optical resin into a mold. This process makes it possible to mass-produce non-spherical lenses at a comparatively low cost. However, the plastic lenses have other drawbacks. When exposed to heat, the plastic lenses will expand more than comparable glass lenses. This results in large variations in quality due to temperature variations. Furthermore, plastic lenses suffer a great deal of shrinkage during molding, with the resulting effect that mass-produced lenses often do not accurately reflect the shapes of their respective molds. Such lenses usually exhibit a profound degree of distortion.

SUMMARY OF THE INVENTION

In view of the aforementioned problems in the prior art, it is a primary object of this invention to provide a non-spherical optical lens with satisfactory temperature characteristics which can be produced at a low cost.

It is an additional object of the invention to provide a lens that is composed primarily of glass, the temperature characteristics of which, such as thermal expansion, are comparable to non-spherical glass lenses.

It is yet an additional object of the invention to provide a glass lens with a corrective layer whereby the corrective layer is in the form of a blazed grating. As a result, the corrective layer can be thin and not excessively thick. Because a thin corrective layer can be used, the amount of shrinkage that the corrective layer will undergo during molding can be minimized. Consequently, the amount of distortion that will occur after molding is reduced.

These and other objects of the invention are accomplished by an optical lens that is composed of an inexpensive glass lens upon which a corrective layer is fashioned. The corrective layer, which corrects aberrations due to the surface characteristics of the glass lens, is composed of an optically transparent resin which is formed into a blazed grating. The design enables for the manufacture of glass lens at a low cost and results in a lens having desirable optical qualities.

These and other objects, advantages and features of the invention will become more readily apparent and are understood by reference t the following detailed description of the invention, the appended claims and to the several attached drawings.

DETAILED DESCRIPTION OF THE DRAWINGS

Figure 1:
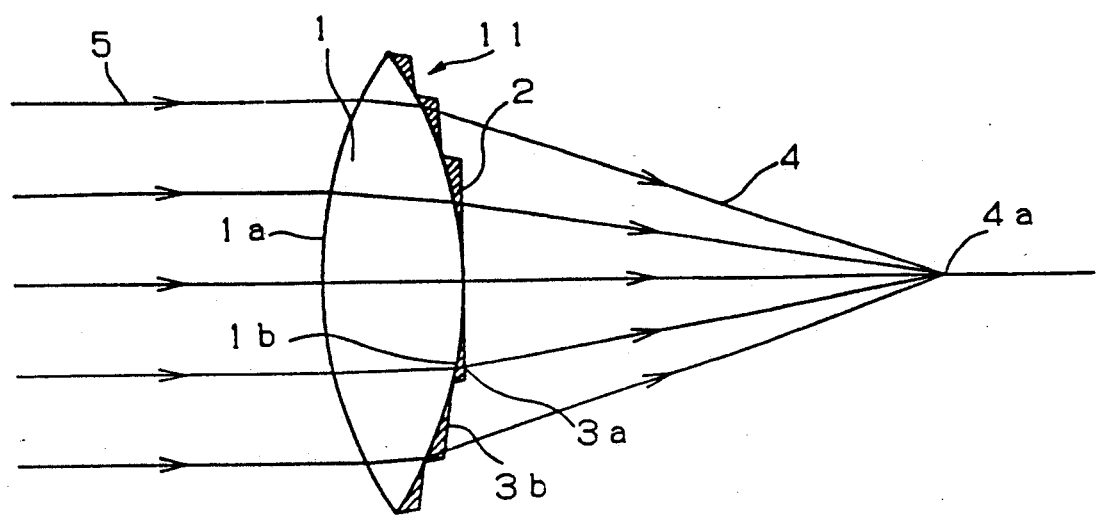
FIG. 1 is a cross-sectional side-view of an optical lens representing a first embodiment of the invention.

Referring now to the drawings wherein like parts are designated by like reference numerals, there is illustrated in FIG. 1 lens element 11 which represents a first embodiment of an optical lens according to the invention. The lens 11 might be used, for example, in an optical sensor to focus flux of a single color emitted by a semiconductor laser.

More particularly, the optical lens 11 consists of a glass lens 1, with two convex spherical surfaces 1a and 1b. Surface 1b is affixed with a corrective layer 2. The layer 2 corrects the spherical aberrations of the glass lens 1. Because a spherical glass lens of the type commonly used in the market can be used for the spherical lens 1, this lens can be mass-produced and thus obtained at a low cost. The corrective layer 2 consists of a blazed grating composed of multiple annuli 3a, 3b, etc. At the point where the spherical aberration of lens 1 is $2n\pi$ (where n is an integer), the angle at which annuli represented by 3a, 3b, are blazed is selected so that the wavefront of light rays 4, which have passed through optical lens 11, are phase-shifted by $2n\pi$. Accordingly, when the parallel light rays 5 enter the optical lens 11, the spherical aberration of lens 1 is corrected by the corrective layer 2. As a result, as shown in FIG. 1, the transmitted rays 4 are focused on a single point 4a.

A transparent optical resin is used as the material for the corrective layer 2. As shall be discussed below, it is desirable to choose a resin which cures when exposed to light, such as ultraviolet rays.

Figure 2:
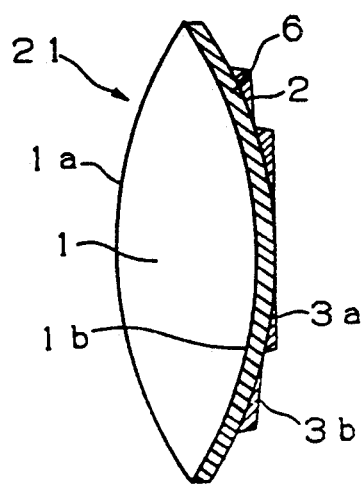
FIG. 2 is a cross-sectional side-view of an optical lens representing a second embodiment of the invention.

FIG. 2 shows a second embodiment of this invention comprising the optical lens 21. In this embodiment, a transparent resin layer 6, of a virtually uniform thickness, is interposed between the convex surface 1b of the spherical glass lens 1 and the corrective layer 2. The same optical resin can be used for the material of the transparent resin layer 6 as is used in the corrective layer 2. Alternatively, a different optical resin can be used for the layer 6 which is highly adhesive with respect to the spherical lens surface 1b.

One of the purposes of the transparent resin layer 6 is to improve the adhesion of the corrective layer 2 to the spherical lens 1. However, layer 6 can also function as an anti-reflective layer in order to minimize the reflection of the light beams which strike it as a result of the difference in the refractive index between the corrective layer 2 and the spherical lens 1. This purpose can be achieved by adjusting the thickness and the refractive index of the layer 6.

Figure 3:
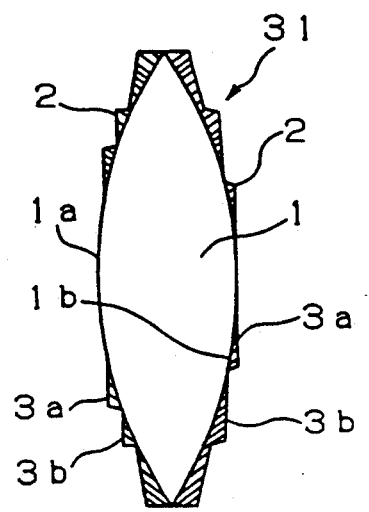
FIG. 3 is a cross-sectional side-view of an optical lens representing a third embodiment of the invention.

FIG. 3 shows a third embodiment of the invention comprising the optical lens 31. In this embodiment, the corrective layers 2, in the form of blazed gratings, are provided on both surfaces 1a and 1b of the spherical glass lens 1.

Figure 4:
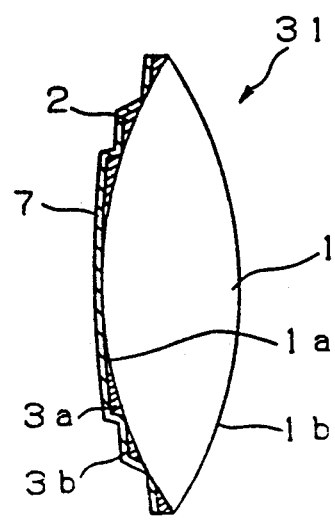
FIG. 4 is a cross-sectional side-view of an optical lens representing a fourth embodiment of the invention.

FIG. 4 shows a fourth embodiment of the invention comprising the optical lens 41. In this embodiment, an anti-reflective layer 7 is built up on top of the corrective layer 2 on the lens surface 1a by vapor deposition or a similar process. The layer 2 is a blazed grating molded onto the convex surface of the spherical glass lens 1. The effect of the anti-reflective layer 7, which is coated onto the corrective layer 2, is to increase the transparency of the optical lens 41.

Figure 5A:
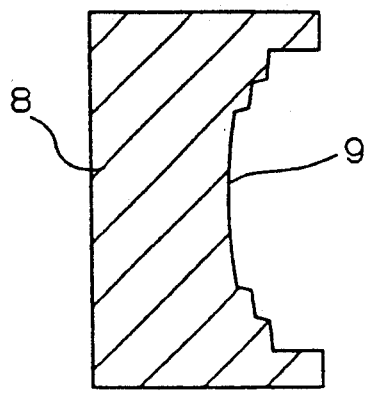
FIG. 5A-5C are cross-sectional side-views representing the manufacturing steps for producing the lens of the present invention.
Figure 5B:
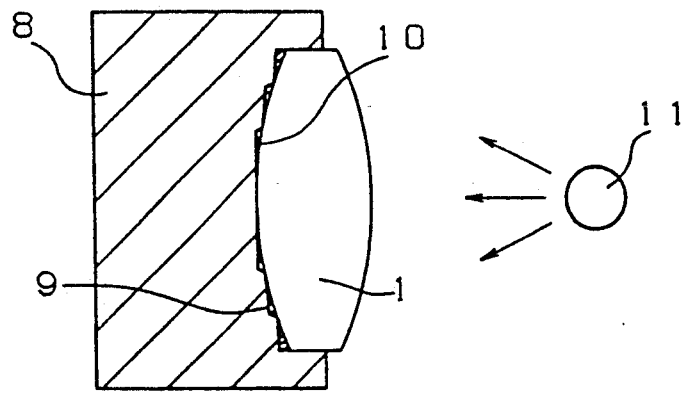
Figure 5C:
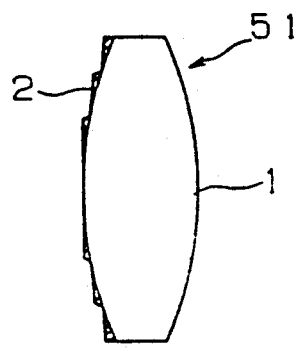

FIGS. 5A, 5B and 5C show the sequence of steps for manufacturing/producing the optical lenses described throughout this specification. The process employs a mold 8 which forms the corrective layer 2. As can be seen in FIG. 5A, the mold includes a cavity 9, in which the corrective layer 2 will be formed. The cavity 9 is created by a lathe or a similar cutting device.

An ultraviolet-hardening resin 10, is first poured, in its uncured state into the inner surface of cavity 9 until the resin fills the mold to a certain level. This resin is the material from which the corrective layer 2 is formed.

As shown in FIG. 5B, the spherical glass lens 1 is then inserted into the filled cavity 9. An ultraviolet lamp 11 is then turned on causing the ultraviolet light rays to pass through the spherical lens 1, irradiating the ultraviolet-hardening resin 10 contained within the cavity 9. A rapid curing of the resin 10 then occurs. As a result, a corrective layer 2 is molded onto the curved surface 1a or 1b of the spherical lens 1. The lens 1 is then removed from the mold 8, and the optical lens 51 is completed, as shown in FIG. 5C.

Using the method of FIGS. 5A-5C the optical lens embodiments of this invention can easily be mass-produced. The molding process and materials used result in a thin corrective layer. As a result of the thin layer, the distortion, due to shrinkage during molding, can be kept to a minimum. In addition, an ordinary glass lens can be used since the thin corrective layer 2 will correct lens aberrations.

Figure 6:
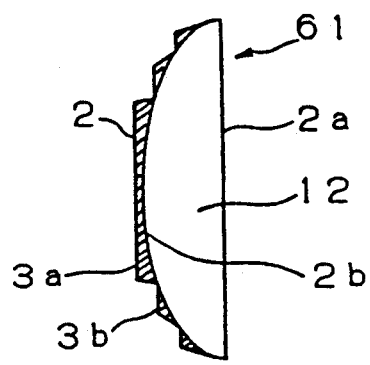
FIG. 6 is a cross-sectional side-view of an optical lens representing a fifth embodiment of the invention.
Figure 7:
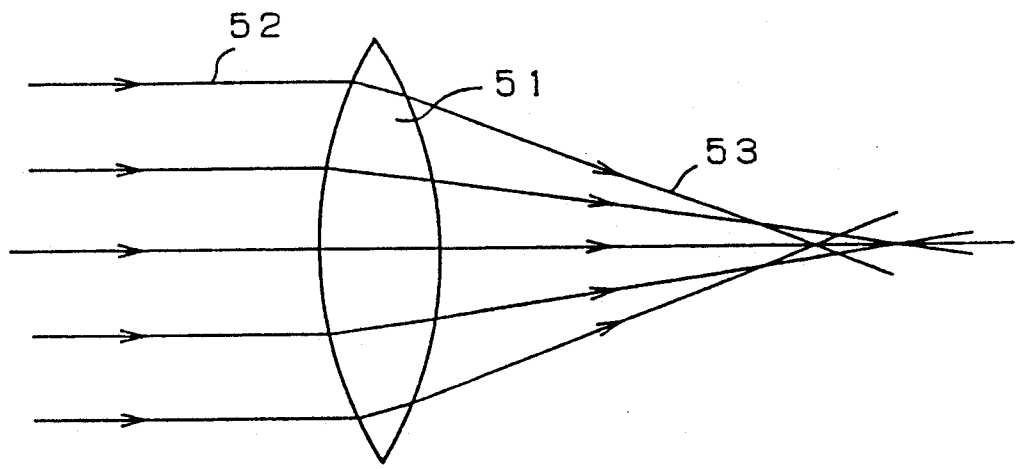
FIG. 7 is a cross-sectional side-view of a conventional spherical lens.
Figure 8:
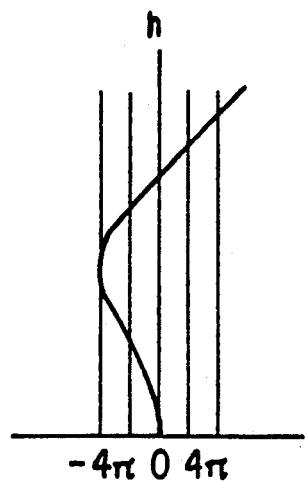
FIG. 8 is a curve expressing wavefront aberrations produced by the lens of FIG. 7.

In the embodiments discussed above in FIGS. 1-4, both surfaces of the spherical lens are convex. As shown in FIG. 6, a corrective layer 2 can also be provided on a lens 61 of a different construction. Specifically, the optical lens 61 consists of a lens 12, which has a flat surface 2a and a convex surface 2b. The corrective layer 2a is formed on the convex surface 2a of lens 12. In addition, such a corrective layer 2 can be furnished on a convex-concave spherical lens; a concave-concave spherical lens; or on the curved surface of a concave-flat spherical lens. Such a corrective layer can also be used on the flat side of a convex-flat spherical lens or a flat-concave spherical lens.

Using the designs of this invention as represented in its various embodiments shown in FIGS. 1-6, an optical lens with the effect of a non-spherical surface can be produced at a low cost. This can be accomplished because a spherical glass lens is used together with a corrective layer composed of an optically transparent resin. In this way, acceptable temperature characteristics can be attained which are comparable to those of a non-spherical glass lens. The use of the corrective layer keeps the optical lens from becoming excessively thick. Further, even though the corrective layer is formed in a mold, shrinkage during molding is kept to a minimum, and the distortion of the lens is reduced.

The above description and the accompanying drawings are merely illustrative of several embodiments of the invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

What is claimed is:

1. An optical lens, comprising:
   a lens element formed of a first material; and
   a corrective layer formed of a second material disposed on a surface of said element, said corrective layer correcting aberrations of said lens element, said corrective layer comprising a blazed grating having a plurality of annuli.

2. The optical lens of claim 1, wherein said first material comprises glass.

3. The optical lens of claim 1, wherein said second material comprises an optically transparent resin.

4. The optical lens of claim 1, wherein said lens element is spherical.

5. The optical lens of claim 1, wherein each of said plurality of annuli are formed having an angle that phase shifts light rays passing through said lens element by $2n\pi$
   such that rays transmitted from said optical lens are focused on a single point.

6. The optical lens of claim 3, wherein said optically transparent resin is cured when exposed to light.

7. The optical lens of claim 6, wherein said light comprises ultraviolet rays.

8. The optical lens of claim 1, wherein said surface of said optical lens is convex and an opposing surface of said optical lens is flat.

9. The optical lens of claim 8, wherein said corrective layer is formed on said convex surface.

10. The optical lens of claim 1, further comprising a transparent resin layer interposed between said at least one surface and said corrective layer to provide an adhesive layer for bonding said corrective layer to said lens element.

11. The optical lens of claim 10, wherein said adhesive layer is made from an optically transparent resin.

12. The optical lens of claim 1, further comprising a second corrective layer formed on an opposite surface of said lens element.

13. The optical lens of claim 1, further comprising an anti-reflective layer built on top of said corrective layer.

14. A method of forming an optical lens having a corrective layer in the form of a blazed grating having a plurality of annuli, comprising the steps of:
   placing an uncured resin into a mold having a cavity formed in the shape of said corrective layer, at least part of said cavity having a stepped profile formed by a plurality of concentric annuli of different diameter;

inserting a glass lens into said mold so that a surface of said glass lens contacts said uncured resin;

exposing said lens and said resin to an agent causing said resin to cure; and removing said glass lens and cured resin corrective layer from said mold.

15. A method as in claim 14, wherein said agent is light.

* * * * *